(12) United States Patent
Van De Vrie et al.

(10) Patent No.: US 9,463,597 B2
(45) Date of Patent: Oct. 11, 2016

(54) METHOD FOR PRINTING A THREE-DIMENSIONAL STRUCTURE, METHOD FOR CONTROLLING A PRINT HEAD AND PRINTED ARTICLE

(71) Applicant: LUXEXCEL HOLDING B.V., Goes (NL)

(72) Inventors: Richard Van De Vrie, Wolphaartsdijk (NL); Joris Biskop, Vlissingen (NL)

(73) Assignee: LUXEXCEL HOLDINGS B.V., Kruiningen (NL)

( * ) Notice: Subject to any disclaimer, the term of this patent is extended or adjusted under 35 U.S.C. 154(b) by 0 days.

(21) Appl. No.: 14/398,248

(22) PCT Filed: May 8, 2013

(86) PCT No.: PCT/EP2013/059638
§ 371 (c)(1),
(2) Date: Oct. 31, 2014

(87) PCT Pub. No.: WO2013/167685
PCT Pub. Date: Nov. 14, 2013

(65) Prior Publication Data
US 2015/0086754 A1    Mar. 26, 2015

(30) Foreign Application Priority Data

May 11, 2012    (EP) .................................. 12003747

(51) Int. Cl.
*B29C 67/00* (2006.01)
*B05C 9/06* (2006.01)
*B29D 11/00* (2006.01)
(Continued)

(52) U.S. Cl.
CPC ....... *B29C 67/0059* (2013.01); *B29C 67/0088* (2013.01); *B05C 9/06* (2013.01); *B29D 11/00* (2013.01); *B29K 2105/0058* (2013.01);
(Continued)

(58) Field of Classification Search
CPC .............................. B29C 67/0059; B05C 9/06
USPC .......................................... 427/402; 264/113
See application file for complete search history.

(56) References Cited

U.S. PATENT DOCUMENTS 3,679,291 A    7/1972    Apfel et al.
3,990,784 A    11/1976   Gelber
(Continued)

FOREIGN PATENT DOCUMENTS

DE    102006003310 A1    3/2007
DE    WO 2010091888 A1 *  8/2010  ....... B29D 11/00278
(Continued)

OTHER PUBLICATIONS

International Preliminary Report on Patentability, Application No. PCT/EP2013/059638 dated Nov. 11, 2014.
(Continued)

*Primary Examiner* — Cachet Sellman
(74) *Attorney, Agent, or Firm* — The Dobrusin Law Firm, P.C.

(57) ABSTRACT

The present invention relates to a method for printing a three-dimensional structure by depositing a plurality of droplets of printing material onto a substrate, wherein the substrate comprises a main plane and wherein the droplets are deposited in such a manner that layers of printing material are generated which are inclined to the main plane of the substrate.

10 Claims, 4 Drawing Sheets

(51) Int. Cl.
  *B33Y 10/00* (2015.01)
  *B33Y 50/02* (2015.01)
  *B33Y 80/00* (2015.01)
  *B29K 105/00* (2006.01)

(52) U.S. Cl.
  CPC ............... *B33Y10/00* (2014.12); *B33Y 50/02* (2014.12); *B33Y 80/00* (2014.12); *Y10T 428/24802* (2015.01)

(56) References Cited

U.S. PATENT DOCUMENTS

| | | | |
|---|---|---|---|
| 4,673,609 A | 6/1987 | Hill | |
| 5,655,339 A | 8/1997 | DeBlock et al. | |
| 5,707,684 A | 1/1998 | Hayes | |
| 6,364,459 B1 | 4/2002 | Sharma et al. | |
| 6,805,902 B1 | 10/2004 | Hayes | |
| 6,833,960 B1 | 12/2004 | Scarbrough et al. | |
| 6,856,462 B1 | 2/2005 | Scarbrough et al. | |
| 7,038,745 B2 | 5/2006 | Weber et al. | |
| 7,393,095 B2 | 7/2008 | Oshima et al. | |
| 7,497,977 B2 * | 3/2009 | Nielsen | B29C 67/0081 264/113 |
| 7,609,451 B1 | 10/2009 | Scarbrough | |
| 8,840,235 B2 | 9/2014 | Blessing | |
| 2001/0048968 A1 | 12/2001 | Cox et al. | |
| 2004/0256754 A1 * | 12/2004 | Koguchi | B41J 3/4073 264/40.1 |
| 2006/0279036 A1 | 12/2006 | Hasei et al. | |
| 2006/0279945 A1 | 12/2006 | Hasei et al. | |
| 2010/0021638 A1 * | 1/2010 | Varanka | B29C 67/0059 427/271 |
| 2011/0298877 A1 * | 12/2011 | Blessing | B29D 11/00 347/102 |
| 2012/0019936 A1 | 1/2012 | Blessing et al. | |

FOREIGN PATENT DOCUMENTS

| | | | |
|---|---|---|---|
| DE | 202010015316 U1 | 2/2011 | |
| EP | 2412767 | 2/2012 | |
| NL | EP 2392473 A1 * | 12/2011 | ............ B29D 11/00 |
| WO | 2006/029268 A1 | 3/2006 | |
| WO | 2010/091888 A1 | 9/2010 | |

OTHER PUBLICATIONS

International Search Report, Application No. PCT/EP2013/059638, dated Jun. 3, 2013.

International Search Report Application No. PCT/EP2013/059378dated Jul. 26, 2013.

Cox, "Mictojet printing of anamorphic microlens arrays," SPIE vol. 2687/89-98, 1996.

Chen, "Sensors and Actuators A: Physical," 369-379, 2008.

* cited by examiner

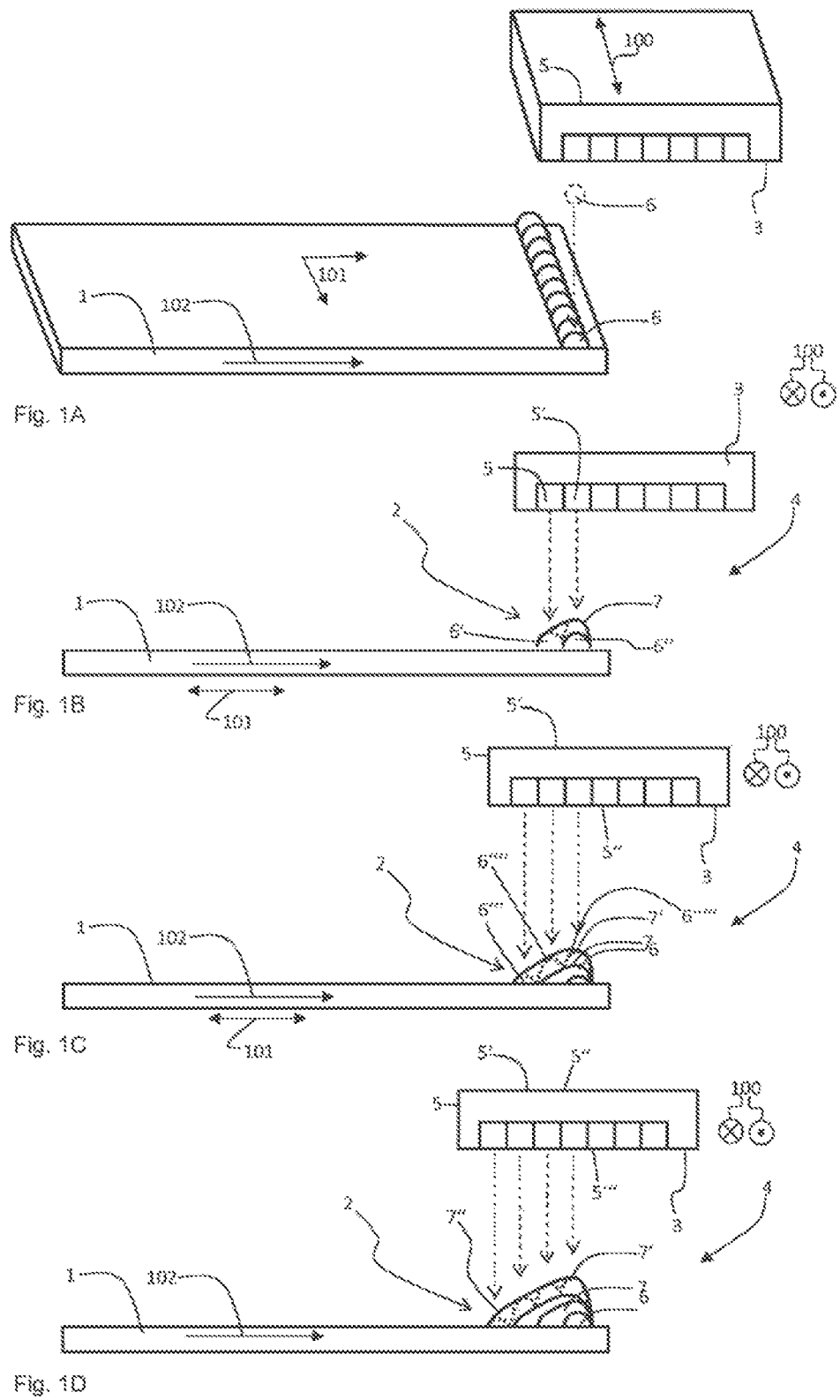

METHOD FOR PRINTING A THREE-DIMENSIONAL STRUCTURE, METHOD FOR CONTROLLING A PRINT HEAD AND PRINTED ARTICLE

BACKGROUND

The present invention relates to a method for printing a three-dimensional structure by depositing a plurality of droplets of printing material onto a substrate. A suchlike method is already known from the international patent application WO 2010/091 888 A1 and can be used for printing light-directing structures, for instance.

The printing time is a limiting factor of the known printing method because every single droplet has to be printed on its own. In order to optimize the printing time the print head ejecting the droplets of printing ink is moved over the substrates several times.

A disadvantage of this purpose is that deviations in the absolute positional accuracy of the print head caused by movement changes accumulate and lead to increasing errors in droplet positions in the end of the printing progress.

SUMMARY

It is therefore an object of the present invention to provide a method for printing three-dimensional structures which works both comparatively fast as well as comparatively accurately.

The object of the present invention can be achieved with a method for printing a three-dimensional structure by depositing a plurality of droplets of printing material onto a substrate, wherein the substrate comprises a main plane and wherein the droplets are deposited in such a manner that layers of printing material are generated which are inclined to the main plane of the substrate It is herewith advantageously possible to built up a three-dimensional structure with higher accuracy compared to the prior art because the inclined layers of printing ink can be generated with fewer printhead movements. Simultaneously, inclined layers of printing ink can be generated very fast, if the print head comprises multiple ejection nozzles. The printing ink comprises e.g. a transparent or translucent printing ink for printing light directing structures, like lenses (convex, concave or Fresnel lenses), prisms or light conductors, or a colored printing ink. Preferably, the printing ink comprises an UV curable liquid monomer which becomes a polymer when cured with UV light. The substrate can be a part of the printed article or a support plate for supporting the deposited droplets only during the printing process. Preferably, the droplets are deposited on such a manner that the angle between at least one layer and the main plane is between 5 and 85 degrees, preferably between 20 and 60 degrees and particularly preferably between 30 and 50 degrees. Preferably, the main plane is oriented in a substantially horizontal manner.

According to a preferred embodiment of the present invention, a plurality of different layers of printing material are stacked at least partially one above the other onto the substrate, wherein the stacked layers are substantially parallel to each other and inclined to the main plane of the substrate. The three-dimensional structure is at least partially formed by the stacked layer of printing ink, so that a comparatively fast manufacturing process with as few movements of the print head as possible is provided.

According to a preferred embodiment of the present invention adjacent droplets are deposited in different heights relatively to the substrate and merge to an inclined layer. It is herewith advantageously possible to build up inclined layers very fast, when the droplets arranged in different heights merge with each other. In particular, the wording "deposition of droplets in different heights" means that the distance between the droplets and the substrate is different (measured perpendicular to the horizontal main plane) according to the sense of the present invention. Preferably, some droplets are deposited onto further droplets in order to achieve the different heights, wherein the further droplets have been deposited in previous printing steps and wherein the further droplets are part of underlying layers.

According to a preferred embodiment of the present invention single deposited droplets, clusters of a plurality of droplets and/or layers are cured by curing means during the printing procedure. Preferably, a layer made of several merged droplets is at least partially cured before further droplets are deposited onto the layer in order to generate another layer located above this layer.

Another subject or another preferred embodiment of the present invention is a method for printing a three-dimensional structure by means of a print head having at least two ejection nozzles, wherein a first droplet of printing material is ejected from the first ejection nozzle in a first step, wherein a second droplet of printing material is ejected from the first ejection nozzle next to the deposited first droplet and a third droplet of printing material is ejected from the second ejection nozzle on top of the deposited first droplet in a second step in such a manner that the second and the third droplets merge with each other to generate a first layer of printing material. In principle, it is herewith advantageously possible to build up a three-dimensional structure during a stepwise or continuously movement of the substrate along a single feeding direction. Meanwhile, the print head is moved preferably several times along a scanning direction which is perpendicular to the feeding direction. Preferably, the printing ink deposits a plurality of first droplets in an interrupted or continuous row extending parallel to the scanning direction. As a result of the described printing method, a layer of printing material is generated having an inclined orientation relatively to the main plane of the substrate or the printed article. The purpose of this method is that the substrate has no longer to be moved several times forwards and backwards in order to built up three-dimensional and multi-layered structures. As a consequence, the accuracy of the printing procedure is increased and simultaneously the printing time can be decreased. The person skilled in the art understands that the print head could alternatively also be moved along the feeding direction, so that a movement of the substrate 1 is not required, at all, for building up the three-dimensional structure.

According to a preferred embodiment of the present invention, the print head is moved along a scanning direction during the first, second and/or third step in order to deposited a plurality of first droplets, a plurality of second droplets, a plurality of third droplets, a plurality of fourth droplets, a plurality of fifth droplets and/or a plurality of sixth droplets. It is herewith advantageously possible that the print head deposits a plurality of first, second, third, fourth, fifth and/or sixth droplets in interrupted or continuous rows extending parallel to the scanning direction, so that the three-dimensional structures can built up very fast.

Preferably, a fourth droplet is ejected from the first ejection nozzle next to the deposited second droplet and a fifth droplet is ejected from the second ejection nozzle on top of the deposited second droplet and a sixth droplet is ejected from a third ejection nozzle on top of the deposited third droplet in a third step in such a manner that the fourth, fifth and sixths droplets merge with each other to generate a second layer of printing material. In this manner, a second layer can be generated onto the first layer during the single print head movement, wherein the substrate is moved stepwise or continuously along the feeding direction during the third step. Thus, the accuracy of the printed three-dimensional structure can be increased, whereas the printing time can simultaneously be reduced. In particular, the second and/or third steps are repeated several times to generate a plurality of layers stacked on top of each others, wherein at least one layer is inclined to a main plane of a substrate. In this manner, a plurality of stacked layers or printing material can be generated during one single movement of the substrate along the feeding direction. It is also conceivable that the substrate performs one forward movement and one backward movement, when complex structures should be printed. In this case, the number of layers is limited only by the maximum number of different ejection nozzles arranged one behind the other along the movement direction. It is conceivable that printing ink forming one single droplet is ejected only by one single nozzle of the print head or that a plurality of nozzles ejects printing ink building up one single droplet.

Another subject of the present invention is a method for controlling a print head for performing the method for printing a three-dimensional structure according to the present invention.

According to a preferred embodiment of the present invention, the deposited first droplet is finally or partially cured in a first curing step performed between the first step and the second step. It is herewith advantageously possible that the first droplet is at least partially hardened before the third droplet is deposited on top of the first droplet. This avoids the uncontrolled deliquesce of the deposited printing ink on the substrate and allows therefore to build up three dimensional structures in an efficient, fast and reliable way. Particularly, the final curing of the first droplet is performed in further curing steps at a later time. Accordingly, the deposited second and third droplets are finally or partially cured in a second curing step performed between the second step and the third step, so that the second and third droplets are at least partially cured before the fourth, fifth and sixths droplets are deposited. Preferably, the second and third droplets are finally cured in the third curing step for partially or finally curing the deposited fourth, fifth and sixth droplets.

According to an alternative preferred embodiment of the present invention, the viscosity of the printing material during the printing process is chosen in such a manner that an uncontrolled deliquesce of the deposited printing ink on the substrate before the next layer of droplets is deposited is avoided. This approach provides a method to build up three dimensional structures in an efficient, fast and reliable way without the need for intermediate partial curing steps.

Another subject of the present invention is a printed article printed by a method according to one of the preceding claims, wherein the printed article comprises a three-dimensional structure built up by different layers of printing material, wherein at least one layer of the different layers are inclined to a main plane of the printed article and/or to a main plane of a substrate of the printed article. Preferably, the different layers of printing material have been used for building up the three-dimensional article, so that the printing time for printing the printed article is reduced and the accuracy of the printed article is substantially increased compared to the prior art which leads to higher quality printed articles and further applications for the printed articles, like e.g. spectacles, spectacle frames, magnifying glasses, high quality lenses and other optical equipments. Preferably, a plurality of different layers of printing material are arranged in a stacked manner at least partially one above the other onto the substrate, wherein the stacked layers are substantially parallel to each other and inclined to the main plane. In this manner, three-dimensional structure with greater heights can be printed comparatively fast. In particular, the angle between at least one layer and the main plane is between 5 and 85 degrees, preferably between 20 and 60 degrees and particularly preferably between 30 and 50 degrees.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

BRIEF DESCRIPTION OF THE DRAWINGS

FIGS. 1A to 1H illustrate schematically a method for printing a three-dimensional structure and a printed article according to an exemplary embodiment of the present invention.

DETAILED DESCRIPTION

Figure 1E:
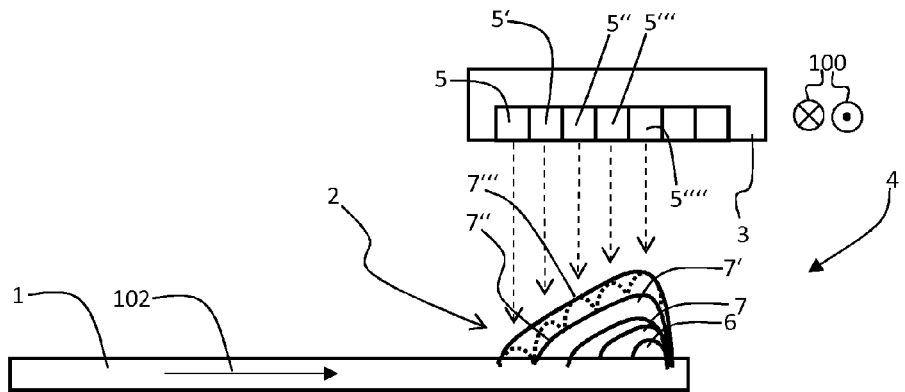

The present invention will be described with respect to particular embodiments and with reference to certain drawings but the invention is not limited thereto but only by the claims. The drawings describe the invention only schematically and non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

Figure 1F:
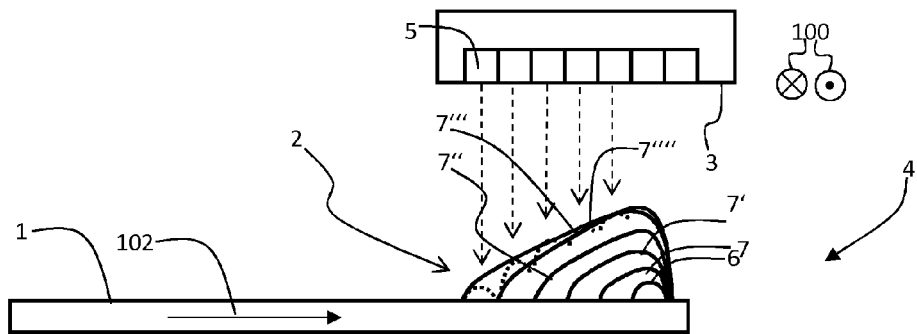
Figure 1G:
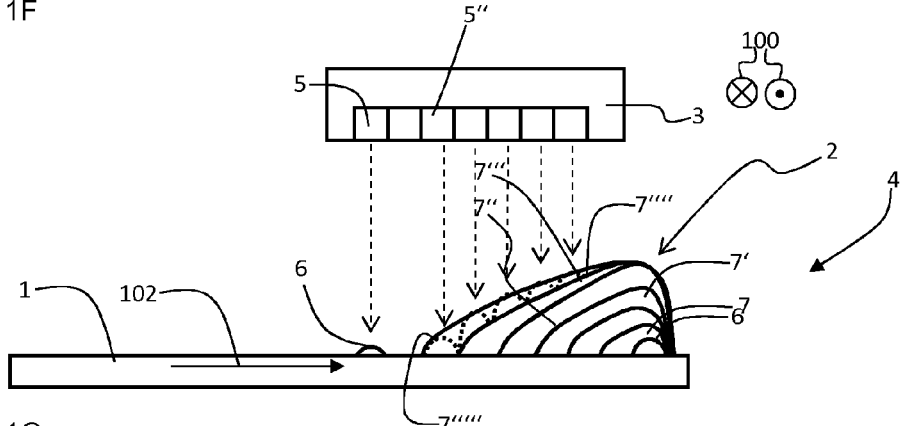
Figure 1H:
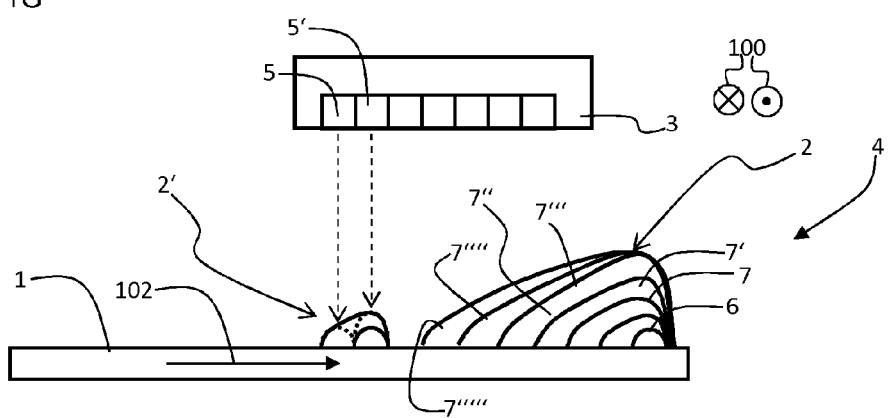

The individual steps of a method for printing a three-dimensional structure according to an exemplary embodiment of the present invention is schematically illustrated in FIGS. 1A to 1H. Furthermore, a printed article which has been printed by this method is schematically illustrated in FIG. 1H. In FIG. 1A, the printing method is schematically shown in a perspective view.

A substrate 1 is illustrated on which the three-dimensional structure 2 is be printed by a movable print head 3 of an inkjet printer. The print head 3 is movable along a scanning direction 100. The substrate 1 can be a part of the printed article 4 comprising the three-dimensional structure 2 which has to be printed or the substrate 1 is a support plate of the inkjet printer for supporting the three-dimensional structure 2 only during the printing process. The substrate 1 can be transported along a feeding direction 102 through the inkjet printer. The print head 3 comprises a plurality of ejection nozzles 5 for ejecting individual droplets 6 of a liquid printing ink towards the substrate 1. The printing ink comprises in particular a transparent, translucent and/or colored UV curable monomer which becomes a polymer when cured. The different ejection nozzles 5 can either eject printing ink of the same type or eject printing ink of different types. The different ejection nozzles 5 are arranged in pattern linearly one behind the other along the scanning direction 100 and one beside the other along the feeding direction 102. It is conceivable that printing ink forming one single droplet 6 is ejected only by one single nozzle 5 or that a plurality of nozzles 5 ejects printing ink building up one single droplet 6.

In a first step, shown in FIG. 1A, the print head 3 ejects a plurality of first droplets 6 of printing ink through first ejection nozzles 5 towards the substrate 1. When the first droplets 6 are deposited onto the substrate 1, the droplets 6 are optionally cured by an UV light source (not shown), e.g. a UV LED provided on the print head 3. The print head 3 is moved at least one time along the scanning direction 100 for depositing the plurality of first droplets 6 in a row parallel to the scanning direction 100.

In a second step, shown in FIG. 1B, the substrate 1 is moved along the feeding direction 102 at least for the width of one ejection nozzle 5. Subsequently, second droplets 6' of printing material are ejected from the first ejection nozzles 5 and deposited side by side adjacent to the first droplets 6 onto the substrate 1 (also shown in FIG. 1B) and third droplets 6" are ejected from second ejection nozzles 5' of the print head 3 in such a manner that the third droplet 6" are respectively deposited on top of the first droplets 6. As the second droplets 6' and the third droplets 6" are more or less liquid, the second droplets 6' and the third droplets 6" flow and therefore merge with each other. The mergence of the respective two droplets 6', 6" in the cross-sectional view shown in FIG. 1B leads to a first layer 7 of printing ink. The distance between the third droplets 6" and the substrate 1 is larger than the distance between the second droplets 6' and the substrate 1 because the third droplets 6" are deposited on the first droplets 6 which have at least partially been cured before. The different distances leads to a first layer 7 which is inclined to the main plane 101 of the substrate 1. In the present example, the angle between the first layer 7 and the main plane 101 is between 25 and 35 degrees. The print head 3 is moved at least once along the scanning direction 100 during the second step in order to deposit multiple second and multiple third droplets 6 in interrupted or continuous rows.

In a third step of the printing method, shown in FIG. 1C, the substrate 1 is again moved along the feeding direction 100 at least for a width of one ejection nozzle 5. Afterwards, fourth droplets 6''' are ejected from the first ejection nozzles 5 next to the deposited former second droplets 6' onto the substrate 1, fifth droplets 6'''' are ejected from the second ejection nozzles 5' on top of the deposited second droplets 6' and a sixth droplets 6'''' are ejected from third ejection nozzles 5" on top of the deposited former third droplet 6" in the third step, also shown in FIG. 1C. The fourth, fifth and sixths droplets 6''', 6'''', 6''''' merge with each other to generate a second layer 7' of printing material.

The aforementioned second and third steps are repeated several times in order to generate a third layer 7", shown in FIG. 1D, and a fourth layer 7''', shown in FIG. 1E, a fifth layer 7'''', shown in FIG. 1F, and a sixths layer 7''''', shown in FIG. 1G, whereas further ejection nozzles 5''' are used for ejecting the required further droplets 6. In this manner, it is possible to flexibly build up three-dimensional structures 2 of various shapes and dimensions by moving the substrate 1 merely one time along the one feeding direction 102. The accuracy of the printed three-dimensional structure 2 is therefore comparatively high. A characteristic of the printed article 4 is that the three-dimensional structure 2 is build up by multiple layers 7 which are inclined compared to the main plate 101 of the substrate 1.

It is conceivable that no further droplets 6 are ejected in the area of the first droplets 6 or the second droplets 6' in order to limit the total height of the three-dimensional structure 2 (cp. FIGS. 1F and 1G). Furthermore, it is conceivable that the first ejection nozzles 5 begin to build up a new three-dimensional structure 2', even if subsequent ejection nozzles 5 of the print head 3 still ejects droplets 6 for the former three-dimensional structure 2' (cp. FIGS. 1G and 1H). The highest layer 7''''' is preferably a finishing made e.g. from a different topcoat printing ink.

Alternatively, the print head 3 could also be moved along the feeding direction 102, so that a movement of the substrate 1 is not necessary, at all, for building up the three-dimensional structure 1.

Figure 2A:
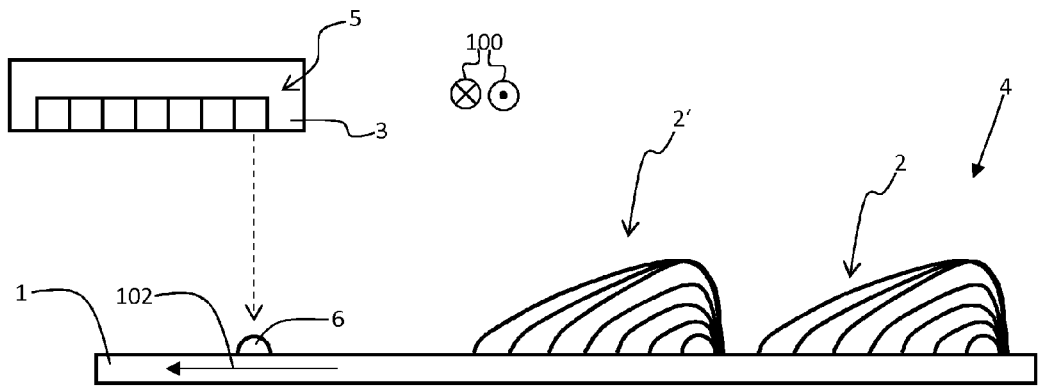
FIGS. 2A to 2C illustrate schematically a method for printing a three-dimensional structure and a printed article according to another exemplary embodiment of the lo present invention.
Figure 2B:
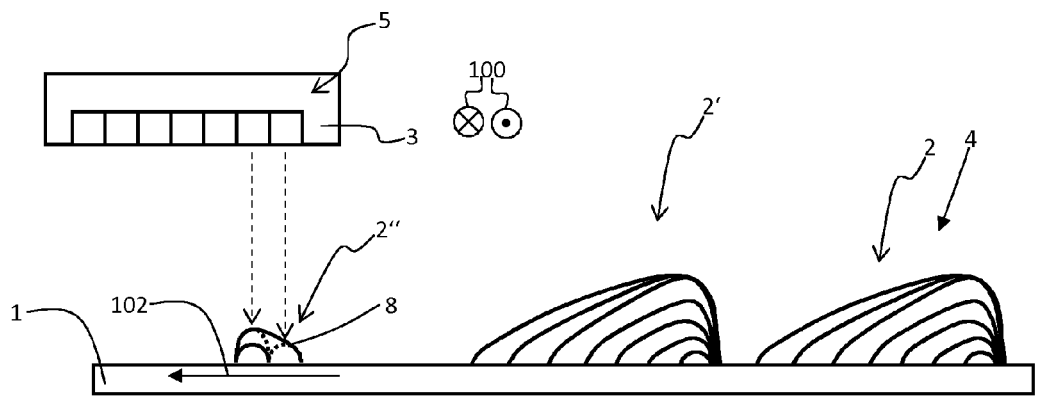
Figure 2C:
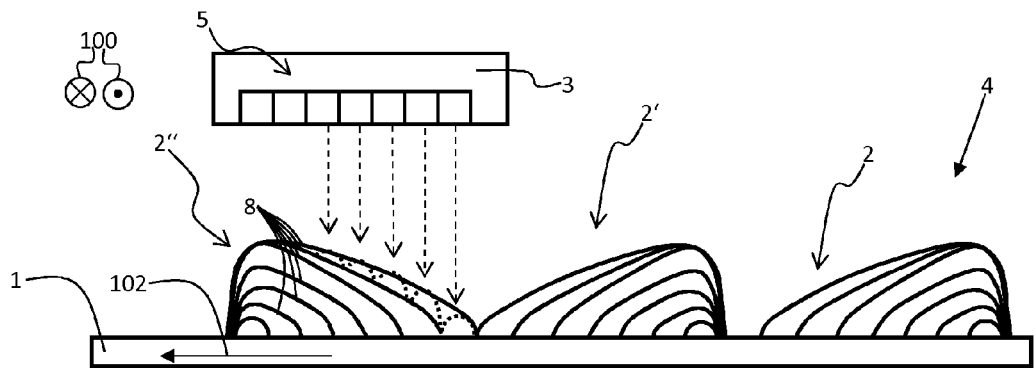

In FIGS. 2A to 2C, a method for printing a three-dimensional structure 2 and a printed article 4 according to another exemplary embodiment of the present invention is schematically illustrated. The substrate 1 is moved back against the former feeding direction 102 in order to build up a further three-dimensional structure 2" with further layers 8 inclined relatively to the main plane 101 of the substrate 1 into the opposite direction compared to the inclined layers 7 of the three-dimensional structure 2'. The individual printing steps are performed in a similar manner as explained above. In the present example, the three-dimensional structure 2' and the further three-dimensional structure 2" form together a diverging lens as the printed article 4, when the printing ink is transparent. The substrate 1 has to be moved only one time forwards and one time backwards to built up the diverging lens, so that the accuracy of the printed diverging lens is comparatively high.

Figure 3:
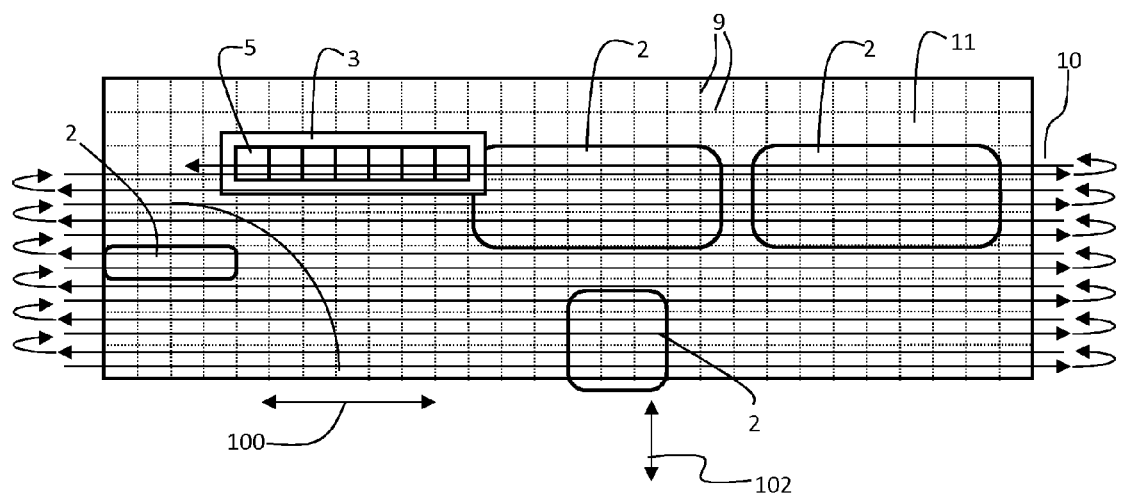
FIG. 3 illustrates schematically a method for printing a three-dimensional structure and a printed article according to according to another exemplary embodiment of the present invention.

FIG. 3 illustrates schematically a method for printing a three-dimensional structure 2 and a printed article 4 according to according to another exemplary embodiment of the present invention. The substrate 1 and the printing head 3 are shown from the bird's eye view in order to illustrate an exemplary working path 10 of the print head 3 for building up several three-dimensional structures 2 onto the substrate 1. The print head 3 moves relatively to the substrate 2 along the working path 10. It is conceivable that the print head 3 is moved only transversely along the scanning direction 100, wherein the substrate 1 moves stepwise longitudinally along the feeding direction 102, when the print head 3 reaches a certain edge of the substrate 1. Alternatively, the print head 3 is moved both transversely along the scanning direction 100 and longitudinally along the feeding direction 102. The substrate 1 is divided into a pixel pattern 9, wherein the print head 3 is able to deposit individual droplets 6 in each pixel 11. In the present example, the print head 3 comprises seven ejection nozzles 5 provided one behind the other along the scanning direction 100. It is clear for the person skilled in the art that the print head 3 can also be provided with a higher or lower number of ejection nozzles 5. Furthermore, the print head 3 can be provided with multiple rows of ejection nozzles 5 to increase the printing velocity.

REFERENCE SIGNS 1 substrate
2 three-dimensional structure
3 print head
4 printed article
5 ejection nozzle
6 droplet
7 layer
8 further layer
9 pixel pattern
10 working path
100 scanning direction
101 main plane
102 feeding direction

What is claimed is:

1. A method for printing a three-dimensional structure by means of a print head having at least two ejection nozzles, wherein a first droplet of printing material is ejected from a first ejection nozzle onto a substrate in a first step, wherein a second droplet of printing material is ejected from the first ejection nozzle next to the deposited first droplet and a third droplet of printing material is ejected from a second ejection nozzle on top of the deposited first droplet in a second step in such a manner that the second and the third droplets merge with each other to generate a first layer of printing material.

2. The method according to claim 1, wherein the deposited first droplet is finally or partially cured in a first curing step performed between the first step and the second step.

3. The method according to claim 2, wherein the substrate is moved along a feeding direction during the second step.

4. The method according to claim 3, wherein a fourth droplet is ejected from the first ejection nozzle next to the deposited second droplet and
wherein a fifth droplet is ejected from the second ejection nozzle on top of the deposited second droplet and a sixth droplet is ejected from a third ejection nozzle on top of the deposited third droplet in a third step in such a manner that the fourth, fifth and sixth droplets merge with each other to generate a second layer of printing material,
wherein the substrate is moved stepwise or continuously along the feeding direction during the third step.

5. The method according to claim 4, wherein the deposited second and third droplets are finally or partially cured in a second curing step performed between the second step and the third step.

6. The method according to claim 5, wherein the deposited fourth, fifth and sixth droplets are finally or partially cured in a third curing step performed after the third step,
wherein the first droplets and/or the second and third droplets are finally cured in the third curing step.

7. The method according to claim 6, wherein the third step is repeated several times to generate a plurality of layers stacked on top of each other, wherein at least one layer is inclined to a main plane of a substrate.

8. The method according to claim 7, wherein the print head is moved along a scanning direction during the first, second and/or third step in order to deposited a plurality of first droplets, a plurality of second droplets, a plurality of third droplets, a plurality of fourth droplets, a plurality of fifth droplets and/or plurality of sixth droplets.

9. The method according to claim 5, wherein the first droplet is finally cured in the second curing step.

10. The method according to claim 3, wherein the substrate is moved stepwise or continuously.

* * * * *